(12) United States Patent
Sukegawa et al.

(10) Patent No.: US 9,201,179 B2
(45) Date of Patent: Dec. 1, 2015

(54) METHOD OF MANUFACTURING BLAZED DIFFRACTIVE GRATING AND METHOD OF MANUFACTURING MOLD FOR MANUFACTURING BLAZED DIFFRACTIVE GRATING

(75) Inventors: Takashi Sukegawa, Utsunomiya (JP); Yukinobu Okura, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 296 days.

(21) Appl. No.: 13/316,613

(22) Filed: Dec. 12, 2011

(65) Prior Publication Data

US 2012/0152080 A1 Jun. 21, 2012

(30) Foreign Application Priority Data

Dec. 15, 2010 (JP) ................................. 2010-279865

(51) Int. Cl.
*G02B 5/18* (2006.01)
*B29D 11/00* (2006.01)

(52) U.S. Cl.
CPC ........ *G02B 5/1852* (2013.01); *B29D 11/00769* (2013.01); *G02B 5/1857* (2013.01); *G02B 5/1861* (2013.01); *Y10T 83/0304* (2015.04)

(58) Field of Classification Search
CPC .. G02B 5/0221; G02B 5/1847; G02B 5/1852; G02B 5/1857; G02B 5/1861; B29D 11/00769
USPC ............. 359/571, 558, 566, 572, 575; 83/875
See application file for complete search history.

(56) References Cited

U.S. PATENT DOCUMENTS

| | | | |
|---|---|---|---|
| 3,045,532 A | 7/1962 | Staunton | |
| 6,067,197 A * | 5/2000 | Blasiak et al. | 359/571 |
| 6,590,709 B1 * | 7/2003 | Ori et al. | 359/566 |
| 7,035,507 B2 * | 4/2006 | Hayashi | 385/37 |
| 2004/0190152 A1 | 9/2004 | Hayashi | |
| 2005/0045814 A1 | 3/2005 | Shimomura et al. | |
| 2009/0022036 A1 * | 1/2009 | Ide et al. | 369/112.03 |
| 2010/0284084 A1 * | 11/2010 | Ishibe | 359/571 |
| 2012/0156967 A1 * | 6/2012 | Sukegawa et al. | 451/28 |
| 2012/0229904 A1 * | 9/2012 | Kitamura et al. | 359/571 |
| 2013/0089118 A1 * | 4/2013 | Kitamura et al. | 372/59 |

FOREIGN PATENT DOCUMENTS

| | | | |
|---|---|---|---|
| GB | 817051 A | | 7/1959 |
| JP | 10209533 A | | 8/1998 |
| JP | 2002233912 A | * | 8/2002 |

OTHER PUBLICATIONS

English machine translation of Tomita (JP 2002233912).*
English Machine Translation of Tomita (previously provided).*
Lee, et al. "Optimizing the Fabrication Process of a High-efficiency Blazed Grating through Diamond Scribing and Molding." J. Micromech. Microeng. 20 (Apr. 26, 2010): 1-7 (previously provded).*
European Search Report issued in corresponding European Patent Application No. EP11189105.7, dated Jun. 1, 2012.

* cited by examiner

*Primary Examiner* — Thomas K Pham
*Assistant Examiner* — Nicholas Pasko
(74) *Attorney, Agent, or Firm* — Rossi, Kimms & McDowell LLP

(57) ABSTRACT

A method of manufacturing a blazed diffractive grating includes a first step of forming a first groove having a first surface and a second surface by moving, in the first direction at a first position in the second direction, a cutting tool having a first cutting blade and a second cutting blade to cut the object; a second step of forming a second groove by moving, in the first direction at a second position separated from the first position in the second direction by a grating pitch, the cutting tool to cut the object; and a third step of forming a blazed surface of the first groove using the first cutting blade by moving, in the first direction at a third position between the first position and the second position, the cutting tool to cut the first surface of the first groove.

8 Claims, 4 Drawing Sheets

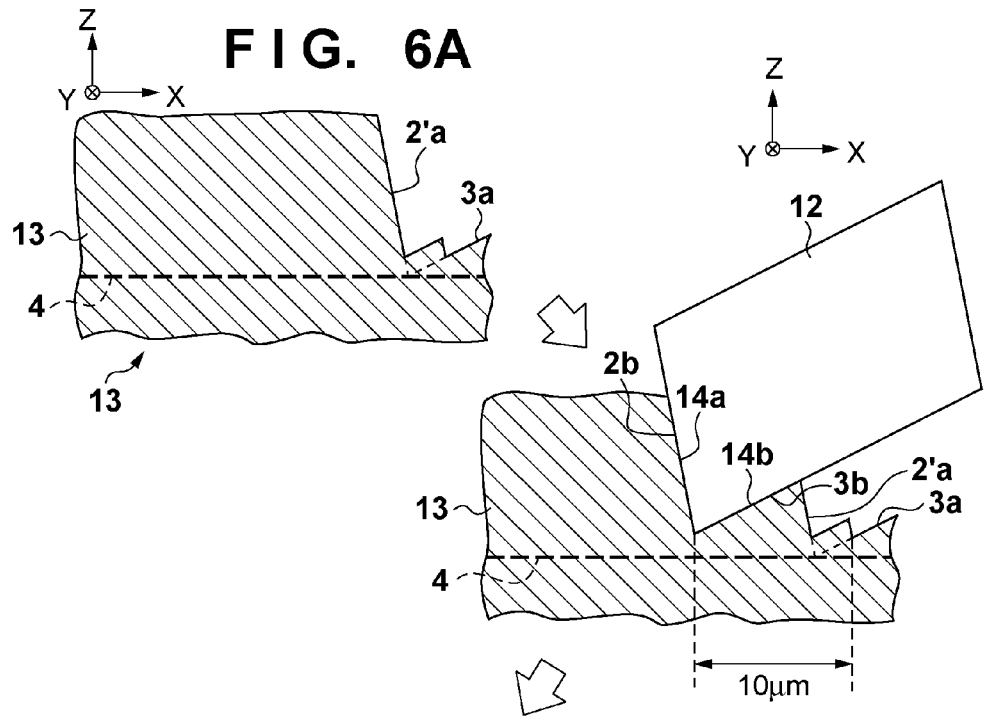
FIG. 6A
FIG. 6B
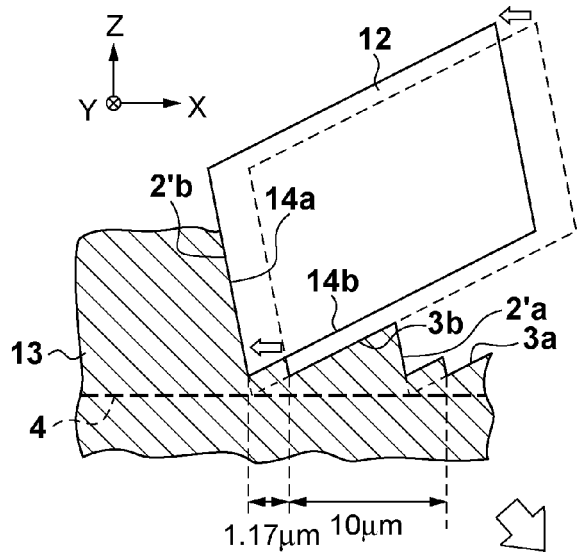
FIG. 6C
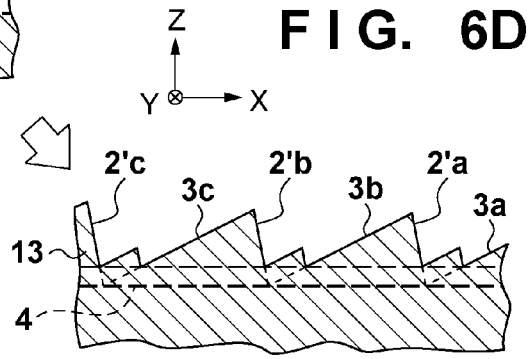
FIG. 6D

METHOD OF MANUFACTURING BLAZED DIFFRACTIVE GRATING AND METHOD OF MANUFACTURING MOLD FOR MANUFACTURING BLAZED DIFFRACTIVE GRATING

This application claims the benefit of Japanese Patent Application No. 2010-279865 filed Dec. 15, 2010, which is hereby incorporated by reference herein in its entirety.

BACKGROUND OF THE INVENTION

1. Field of the Invention

The present invention relates to a method of manufacturing a blazed diffractive grating and a method of manufacturing a mold for manufacturing a blazed diffractive grating.

2. Description of the Related Art

As shown in FIG. 1, a blazed diffractive grating has asymmetrical triangular grooves, and includes a blazed surface 2' on which light 7 is incident, and a counter surface 3 adjacent to the blazed surface 2'. The blazed surface 2' and counter surface 3 respectively tilt at predetermined angles with respect to a grating surface 4. In such a blazed diffractive grating, the diffraction efficiency must be concentrated on a given order. To achieve a high diffraction efficiency, it is required that the blazed surface 2' is flat and its unevenness or roughness is small. A cutting volume largely influences the flatness of the blazed surface 2'. If a cutting volume in one cutting process is large, burrs and surface roughness occur on the blazed surface 2', as shown in FIG. 2.

To decrease stress that acts on an object in forming one groove in it, therefore, a groove processing method of performing a shallow cutting process many times is adopted. Japanese Patent Laid-Open No. 2002-233912 has disclosed a groove processing method of forming an isosceles triangular groove in an object by performing a cutting process six times to suppress occurrence of burrs at the edges of the groove. In this method, a cutting process is performed twice at a position shifted to one side from the forming position of a groove, and is performed twice at a position shifted to the other side, and finally a finishing process is performed at the forming position of the groove.

To manufacture one blazed diffractive grating, for example, it may sometimes be necessary to form tens of thousands of grooves. In the conventional technique of repeatedly performing a shallow cutting process many times to form one groove, the time required to process grooves is too long, thereby reducing the manufacturing efficiency.

SUMMARY OF THE INVENTION

The present invention provides, for example, a method of manufacturing a blazed diffractive grating, which is advantageous in terms of manufacturing efficiency.

The present invention in its first aspect provides a method of manufacturing a blazed diffractive grating in which a plurality of grooves each extending in a first direction are arrayed in a second direction perpendicular to the first direction, the method comprising: a first step of forming a first groove having a first surface and a second surface by relatively moving, in the first direction at a first position in the second direction, an object and a cutting tool having a first cutting blade and a second cutting blade to cut the object to respectively form the first surface and the second surface, and simultaneously cutting the object; a second step of forming, after the first step, a second groove by relatively moving, in the first direction at a second position separated from the first position in the second direction by a grating pitch, the object and the cutting tool to cut the object; and a third step of forming, after the second step, a blazed surface of the first groove using the first cutting blade by relatively moving, in the first direction at a third position between the first position and the second position, the object and the cutting tool without bringing the second cutting blade into contact with the second surface of the first groove to cut the first surface of the first groove.

The present invention in its second aspect provides a method of manufacturing a mold for manufacturing a blazed diffractive grating in which a plurality of grooves each extending in a first direction are arrayed in a second direction perpendicular to the first direction, the method comprising: a first step of forming a first groove having a first surface and a second surface by relatively moving, in the first direction at a first position in the second direction, an object and a cutting tool having a first cutting blade and a second cutting blade to cut the object to respectively form the first surface and the second surface; a second step of forming, after the first step, a second groove by relatively moving, in the first direction at a second position separated from the first position in the second direction by a grating pitch, the object and the cutting tool to cut the object; and a third step of forming, after the second step, a surface, corresponding to a blazed surface of the blazed diffractive grating, in the first groove using the first cutting blade by relatively moving, in the first direction at a third position between the first position and the second position, the object and the cutting tool without bringing the second cutting blade into contact with the second surface of the first groove to cut the first surface of the first groove.

Further features of the present invention will become apparent from the following description of exemplary embodiments with reference to the attached drawings.

BRIEF DESCRIPTION OF THE DRAWINGS

FIGS. 6A to 6D are views for explaining the groove processing method of the present invention;

DESCRIPTION OF THE EMBODIMENTS

To explain the present invention, an embodiment for manufacturing a brazed diffractive grating by groove processing will be shown. A cutting machine used to manufacture a blazed diffractive grating is a position-controllable high-precision machine which can instruct cutting on the order of several tens of nanometers. As a tool, a cutting tool such as a diamond cutting tool whose tip is sharp and whose machining transfer property is high is used. The material of an object is selected from copper-, aluminum-, and electroless nickel-based materials which have high machinability by a diamond cutting tool.

Figure 1:
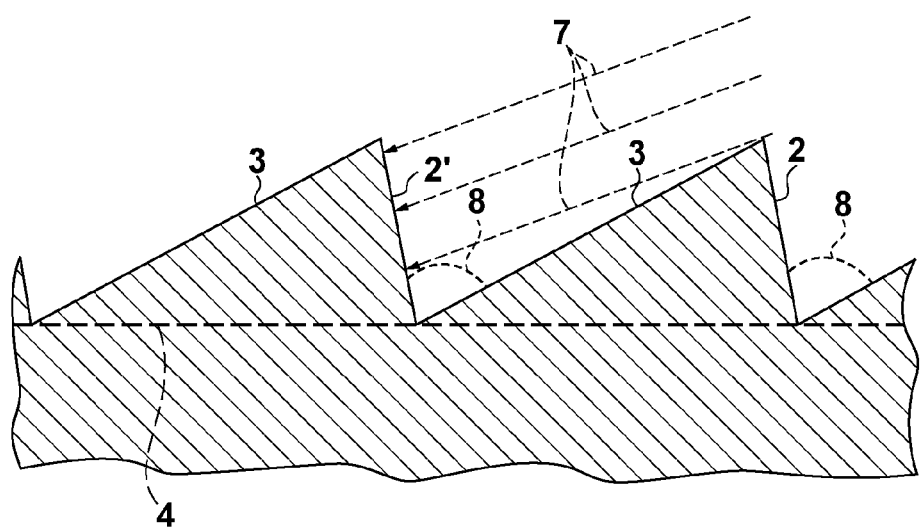
FIG. 1 a sectional view showing a blazed diffractive grating.
Figure 2:
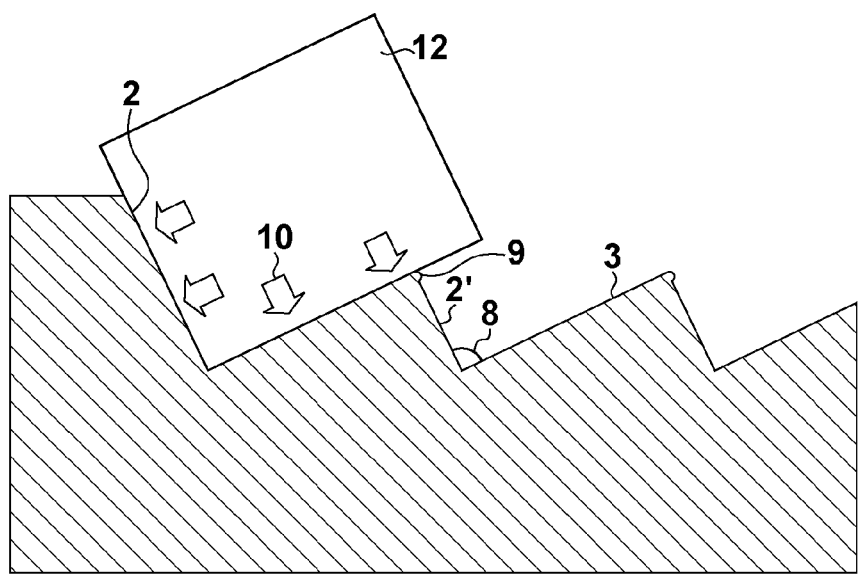
FIG. 2 is a view showing a conventional groove processing method.
Figure 3:
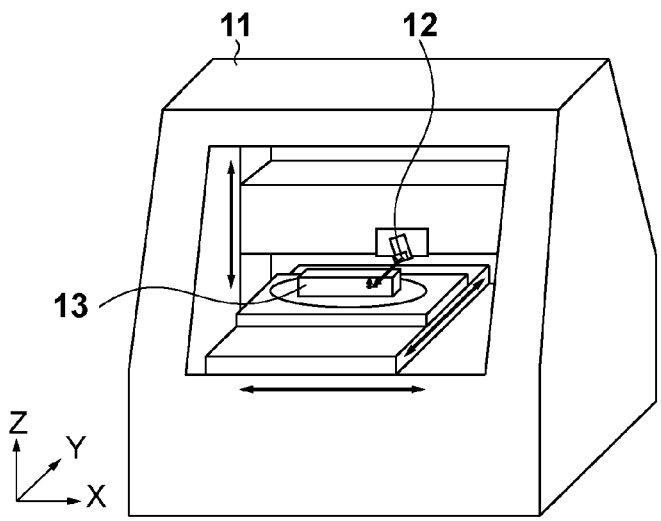
FIG. 3 is a schematic view showing a cutting machine used in the present invention.

FIG. 3 shows an overview of the arrangement of a cutting machine 11, a cutting tool 12, and an object 13 used in this embodiment. The cutting machine 11 has a gate-shaped, high-rigidity structure, resists external vibrations and the like, and is appropriate for superhigh-resolution, position-controllable, ultraprecision cutting. In the cutting machine 11, the cutting tool 12 is attached to a structure slidable in the Z (vertical) direction, and the object 13 is attached on a table slidable in the X (lateral) and Y (back-and-forth) directions.

Figure 4:
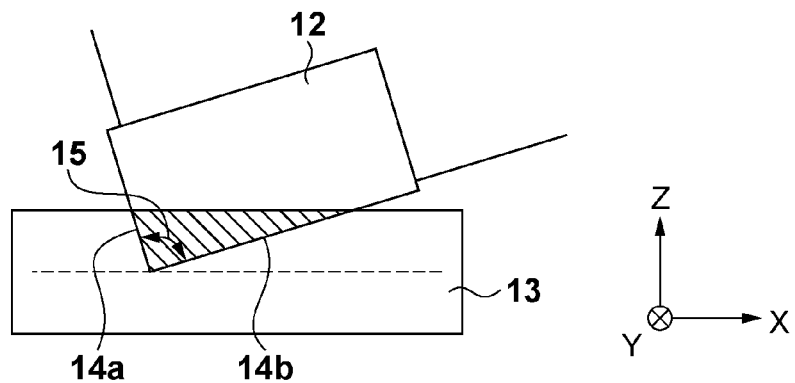
FIG. 4 is a sectional view showing an object and a cutting tool in a groove processing method of the present invention.

As shown in FIG. 4, the cutting tool 12 has a first cutting blade 14a and a second cutting blade 14b which transfer a polygonal groove cross-sectional shape. An angle 15 formed by the first cutting blade 14a and second cutting blade 14b can be almost equal to an opening angle 8 (for example, 85°) of a groove to be formed, and a shape formed by the tips of the first cutting blade 14a and second cutting blade 14b can be sharp as much as possible when enlarged. The opening angle of the groove can be less than 90°. The linear precisions of the ridgelines of the first cutting blade 14a and second cutting blade 14b are very high at the tips of the cutting blades, respectively. When forming a reflection type diffractive grating by groove processing, the finished quality of the wall surfaces of grooves is very important.

Figure 5:
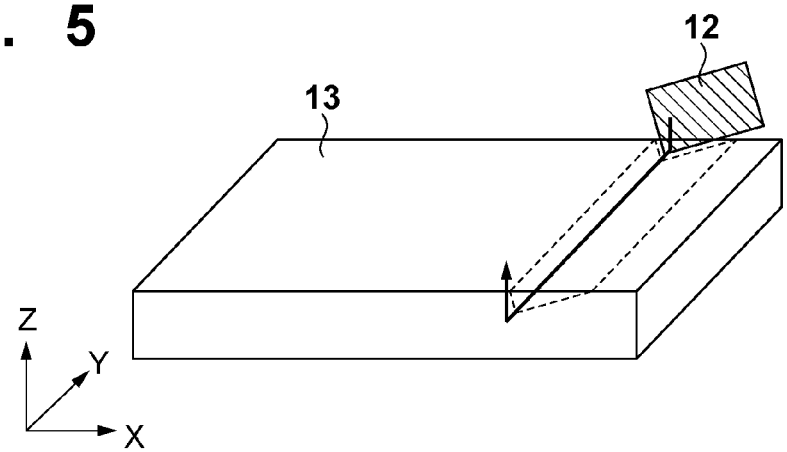
FIG. 5 is a view showing a groove processing operation in the groove processing method of the present invention.

As shown in FIG. 5, the cutting tool 12 is brought down to the object at a position where the cutting tool 12 and the object 13 oppose each other so that a cutting depth in the Z (depth) direction becomes, for example, 3 μm. In this state, the cutting tool 12 and object 13 are relatively moved in the Y direction using the rectilinear propagation control mechanism of the cutting machine 11, thereby cutting and transferring the shape of the cutting blade of the cutting tool 12 to the object 13. At this time, the cutting tool or the object may be actually moved. In a cutting process, by injecting an oil mist on the opposite side of the cutting face of the cutting tool 12, processing heat is removed while allowing chips to smoothly float away, a cutting tool transfer state in cutting is kept fine.

A method of forming one groove by cutting the object 13 using the cutting tool 12 will be described with reference to FIGS. 6A to 6D. In this embodiment, to cut the object 13, the cutting tool 12 is moved in the X direction and is positioned at the first position. Then, by linearly moving the cutting tool 12 in the Y direction by a predetermined length, for example, 55 mm at the first position, one groove (the first groove) with a length of 55 mm which has a first surface 2b and a second surface 3b is formed. The second surface 3b forms the counter surface of the groove but the first surface 2b does not form a blaze surface as described later. In FIG. 6A, the object 13 before the first groove is formed is shown. Grooves each having a blaze surface 2'b and a second surface (counter surface) 3a which have been formed by cutting processes performed up to now are continuously arrayed in the +X direction from the forming position of the first groove. In this embodiment, the Y direction is the first direction in which a groove extends, and the X direction is the second direction which is perpendicular to the first direction and in which a plurality of grooves are arrayed.

A first-stage cutting process (the first step) in forming grooves will be explained with reference to FIG. 6B. The first-stage cutting process is performed by moving the cutting tool 12 to the first position which is separated, by a grating pitch, for example, 10 μm in the −X direction, from a position where a cutting process (the first-stage cutting process for a neighboring grating) before last is performed. At this time, a rotational angle of the cutting tool 12 on the X-Z plane is set so that the first cutting blade 14a tilts at a predetermined angle, for example, 80° with respect to the grating surface 4. A cutting depth of the cutting tool in the Z direction is determined so that the second cutting blade 14b can obtain a predetermined width with respect to the width of the groove in the sectional view while maintaining the angle of the cutting tool. A surface cut by the second cutting blade 14b serves as the counter surface 3.

A second-stage cutting process (the third step) for forming the first groove will be described with reference to FIG. 6C. The second-stage cutting process is performed for the object 13 in the +Y direction by moving the cutting tool 12 to the third position which is separated from the first position by 1.17 μm in the −X direction. At this time, a rotational angle of the cutting tool on the X-Y plane at the third position is set so that the first cutting blade 14a tilts at 80° with respect to the grating surface 4 similarly to the first-stage cutting process. A surface cut by the first cutting blade 14a serves as the blazed surface 2'b. In the second-stage cutting process, the second cutting blade 14b is not brought into contact with the second surface (counter surface) 3b of the first groove formed by the first-stage cutting process. Since, in the second-stage cutting process for the first groove, a blazed surface 2'a of a previously formed neighboring groove does not receive stress, it is possible to avoid burrs and surface roughness from occurring on the blazed surface 2'a. The grating pitch and the rotational angle of the cutting tool 12 described above are merely examples, and may be changed, as a matter of course.

In order not to allow stress to act on the previously formed blazed surface 2'a, the second cutting blade 14b is not brought into contact with the second surface 3b formed by the first-stage cutting process and then the second-stage cutting process is performed, thereby obtaining a flat blazed surface without burrs. The positional relationship between the previously formed groove and the cutting tool in the second-stage cutting process is very important. The positioning accuracy of the cutting tool depends on the accuracy of a machine. However, if the number of grooves to be processed is large, the total processing time may exceed one week. In this case, an error due to environmental variations such as temperature variations is no longer negligible. The first-stage cutting process (the first step) for forming the first groove is performed at the first position, and then the first-stage cutting process (the second step) for forming the second groove is performed at the second position separated from the first position by a grating pitch. It has been found to be effective for obtaining a flat blazed surface to perform the second-stage cutting process (the third step) for forming the first groove at the third position between the first and second positions immediately after the first-stage cutting process for forming the second groove. A blazed diffractive grating or a mold for manufacturing a diffractive grating is manufactured by repeating the first-stage cutting process and the second-stage cutting process in the −X direction a predetermined number of times, for example, 33,500 times, and the number of burrs or the amount of surface roughness on a blazed surface is small compared with the conventional method. Since a cutting process needs to be performed only twice to form one groove, it is possible to efficiently manufacture a blazed diffractive grating having a flat blazed surface or a mold for manufacturing a diffractive grating, as compared with the conventional technique described in Japanese Patent Laid-Open No. 2002-233912.

Figure 7:
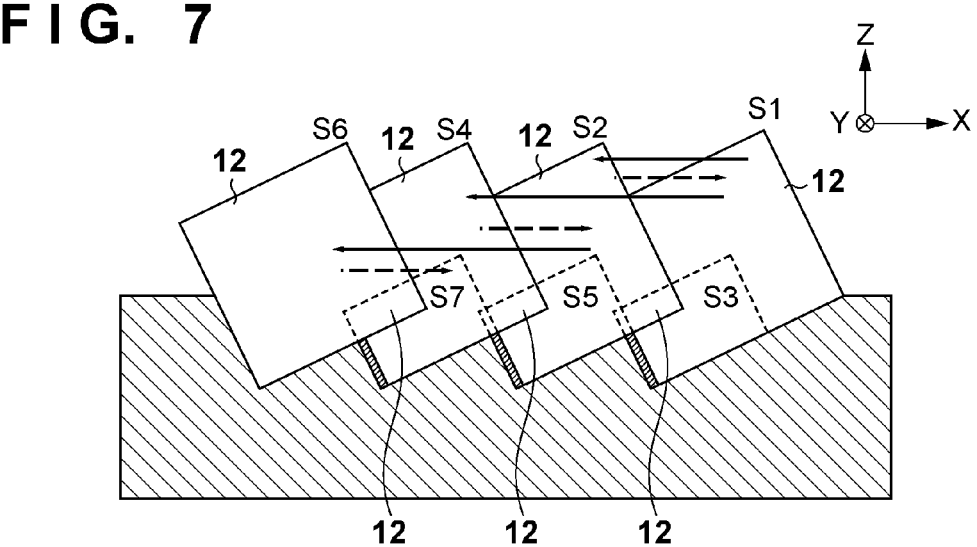
FIG. 7 is a view showing a moving order of the cutting tool in the groove processing method of the present invention.

FIG. 7 shows movement of the position of the cutting tool 12 when repeating a cutting process using one cutting tool. Referring to FIG. 7, the groove forming direction is right to left. In S1, the counter surface of the first groove is formed by performing the first-stage cutting process at the first position.

In S2, the counter surface of the second groove is formed by moving the cutting tool 12 in the forming direction (the −Y direction) by a grating pitch, and then performing the first-stage cutting process at the second position. In S3, the blazed surface of the first groove is formed by performing the second-stage cutting process at a position (the third position) to which the cutting tool 12 is moved back in the X direction by an amount smaller than the grating pitch. Before forming the blazed surface of the second groove, the counter surface of the third groove is formed in S4 by performing the first-stage cutting process at a position to which the cutting tool 12 is moved in the forming direction by the grating pitch from the second position. In S5, the second-stage cutting process is performed to form the blazed surface of the second groove. In S6, the first-stage cutting process is performed to form the counter surface of the fourth groove. In S7, the second-stage cutting process is performed to form the blazed surface of the third groove. After that, these steps are repeated to form a number of grooves.

Figure 8:
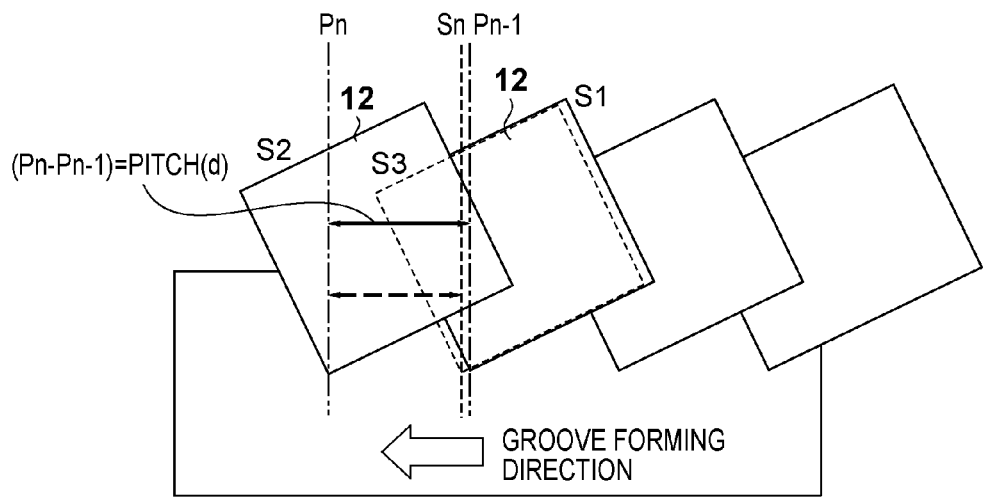
FIG. 8 is a view showing the relative positional relationship of the cutting tool in the groove processing method of the present invention.

FIG. 8 is a view for explaining the relative relationship between the position for the first-stage cutting process and the position for the second-stage cutting process according to a grating pitch. A grating pitch d is a distance between a position $P_{n-1}$ (the first position) for the first-stage cutting process for forming the counter surface of the (n−1)th groove in S1 and a position $P_n$ (the second position) for the 11th-stage cutting process for forming the counter surface of the nth groove in S2. A position $S_n$ (the third position) for the second-stage cutting process for forming the blazed surface of the (n−1)th groove is between the position $P_{n-1}$ (the first position) and the position $P_n$ (the second position).

A blazed diffractive grating including grooves each having a high-precision blazed surface which is manufactured by such a method is used as a wavelength selective element for an excimer laser serving as a UV band light source.

Figure 9:
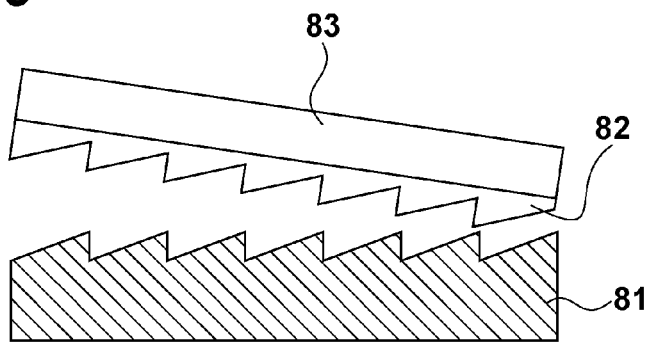
FIG. 9 is a view showing a case in which a grooved product formed by the groove processing method of the present invention is used as a mold.

It is possible to use, as a mold for manufacturing a blazed diffractive grating, a diffractive grating formed by the cutting process described in this embodiment. As shown in FIG. 9, an epoxy resin is filled in a mold 81 formed by a cutting process, and an epoxy resin layer 82 which has been cured by curing the epoxy resin after superimposing a base material 83 for supporting the resin is brought into tight contact with the base material 83. After that, as shown in FIG. 9, the grating shape of the mold 81 is transferred onto the epoxy resin layer 82 by separating the base material 83 from the mold 81, thereby obtaining the blazed diffractive grating 82 made of the epoxy resin. Since a surface corresponding to the blazed surface of the mold 81 is flat without burrs, the blazed surface of the blazed diffractive grating 82 manufactured using the mold 81 is flat. Manufacturing of a replica of such a diffractive grating has been described in detail in Japanese Patent Laid-Open No. 10-209533.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of manufacturing a blazed diffractive grating in which a plurality of grooves each extending in a first direction are arrayed at a grating pitch in a second direction perpendicular to the first direction, the method comprising:
    a first step of forming a first groove having a first surface and a second surface by relatively moving, in the first direction at a first position in the second direction, an object and a cutting tool having a first cutting blade and a second cutting blade to cut the object to respectively form the first surface and the second surface;
    a second step of forming, after the first step, a second groove having a third surface and a fourth surface by relatively moving, in the first direction at a second position separated from the first position in the second direction by the grating pitch, the object and the cutting tool having the first cutting blade and the second cutting blade to cut the object to respectively form the third surface and the fourth surface; and
    a third step of forming, after the second step, a blazed surface of the first groove using the first cutting blade by relatively moving, in the first direction at a third position between the first position and the second position in the second direction, the object and the cutting tool with the second cutting blade not in contact with the second surface of the first groove to cut the first surface of the first groove.

2. The method according to claim 1, wherein the second step is followed by the third step without another step therebetween.

3. The method according to claim 1, wherein an opening angle of the groove defined by the blazed surface and the second surface is smaller than 90°.

4. A method of manufacturing a mold for manufacturing a blazed diffractive grating in which a plurality of grooves each extending in a first direction are arrayed at a grating pitch in a second direction perpendicular to the first direction, the method comprising:
    a first step of forming a first groove having a first surface and a second surface by relatively moving, in the first direction at a first position in the second direction, an object and a cutting tool having a first cutting blade and a second cutting blade to cut the object to respectively form the first surface and the second surface;
    a second step of forming, after the first step, a second groove having a third surface and a fourth surface by relatively moving, in the first direction at a second position separated from the first position in the second direction by the grating pitch, the object and the cutting tool having the first cutting blade and the second cutting blade to cut the object to respectively form the third surface and the fourth surface; and
    a third step of forming, after the second step, a surface, corresponding to a blazed surface of the blazed diffractive grating, in the first groove using the first cutting blade by relatively moving, in the first direction at a third position between the first position and the second position in the second direction, the object and the cutting tool with the second cutting blade not in contact with the second surface of the first groove to cut the first surface of the first groove.

5. The method according to claim 4, wherein the second step is followed by the third step without another step therebetween.

6. The method according to claim 4, wherein an opening angle of the groove defined by the blazed surface and the second surface is smaller than 90°.

7. The method according to claim 1, further comprising:
    a fourth step of forming, after the second step, a third groove having a fifth surface and a sixth surface by relatively moving, in the first direction at a fourth position separated from the second position in the second direction by the grating pitch, the object and the cutting tool having the first cutting blade and the second cutting blade to cut the object to respectively form the fifth surface and the sixth surface; and a fifth step of forming, after the fourth step, a blazed surface of the second groove using the first cutting blade by relatively moving, in the first direction at a fifth position between the second position and the fourth position in the second direction, the object and the cutting tool with the second cutting blade not in contact with the fourth surface of the second groove to cut the third surface of the second groove.

8. The method according to claim 4, further comprising:

a fourth step of forming, after the second step, a third groove having a fifth surface and a sixth surface by relatively moving, in the first direction at a fourth position separated from the second position in the second direction by the grating pitch, the object and the cutting tool having the first cutting blade and the second cutting blade to cut the object to respectively form the fifth surface and the sixth surface; and a fifth step of forming, after the fourth step, a blazed surface of the second groove using the first cutting blade by relatively moving, in the first direction at a fifth position between the second position and the fourth position in the second direction, the object and the cutting tool with the second cutting blade not in contact with the fourth surface of the second groove to cut the third surface of the second groove.

\* \* \* \* \*